United States Patent Office 2,852,567
Patented Sept. 16, 1958

2,852,567

PRODUCTION OF PHENOLS FROM AROMATIC CARBOXYLIC ACIDS

Robert D. Barnard, Walnut Creek, and Robert H. Meyer, Concord, Calif., assignors to The Dow Chemical Company, Midland, Mich., a corporation of Delaware No Drawing. Application January 8, 1954
Serial No. 403,074

10 Claims. (Cl. 260—621)

This invention relates to a method for making phenolic compounds, especially from monocarboxylic acids of the benzene series. It relates in particular to such a method for making phenol from benzoic acid.

Many workers have studied the pyrolysis of benzoic acid. The principal product, under most of the test conditions, has been benzene. Under special conditions such varied products as biphenyl and benzophenone have been obtained. There are a few reports that minor amounts of phenol have been detected in the reaction products of some of the reactions, but no practical conditions have been suggested for producing phenol as the principal product. Thus, it was noted by Ettling, Annalen 53, 87 (1845), and by Stenhouse, Annalen 53, 91 (1845), that dry distillation of benzoic acid with cupric oxide formed some salicylic acid, but that the main products were "neutral bodies," insoluble in aqueous alkali. Sabathier and Mailhe reported in Comptes rendus 159, 217 (1914) that, when benzoic acid was heated to 550° C. with various metals and metal oxides, in attempts to make benzophenone, some phenol was observed when the agent tested was ferric oxide. When studying both non-catalytic and catalytic conversion of benzoic acid to benzene, it was found by Moser, Helvetica chimica acta 14, 971 (1931), (see Chemical Abstracts 26, 646), that the non-catalysed decarboxylation (liberation of carbon dioxide) was accompanied by a small (2 to 8 percent) decarbonylation (liberation of carbon monoxide) to produce some phenol. The same author reported that copper accelerated decarboxylation 9-fold and cadmium accelerated the main reaction 200-fold, and that both agents reduced the amount of decarbonylation, and hence, of phenol formation. None of these isolated observations of minor side reactions which form phenol has lent any encouragement to the belief that phenol could be made as the principal product from benzoic acid, and none has taught a useful set of conditions for attaining such a result.

Phenol has been synthesized almost exclusively from benzene. The ever-increasing demand for benzene for numerous industrial uses makes it desirable that another raw material source be found for phenol. Since benzoic acid can be made readily from toluene, and since supplies of toluene are predicted to be adequate to meet all foreseen demands, it would be especially desirable to have a commercially feasible method for production of phenol from benzoic acid.

It is the principal object of this invention to provide a method whereby phenol can be obtained in good yield from benzoic acid. A related object is to provide a method whereby phenolic compounds can be obtained in good yield from aromatic monocarboxylic acids, especially those of the benzene series, in which any substituents on the aryl nucleus, other than the carboxyl group, are unaffected by the reaction. Other and related objects may appear hereinafter.

According to the present invention, the foregoing and related objects are attained by heating an aromatic monocarboxylic acid, especially one of the benzene series, having at least one open position on the nucleus adjacent the carboxyl group, and in which ring substituents other than carboxyl are stable groups such as phenyl, alkyl, alkoxy, nitro and halogen, to a temperature of at least 200° C. in contact with a cupric compound, especially cupric oxide, to effect oxidation and decarboxylation, and recovering the phenolic compound from the reaction mixture. The reaction may be effected at atmospheric or superatmospheric pressure, as will be shown below. The extent of phenol formation is limited by the amount of cupric compound present, and, when the latter is present in molecular excess, the conversion of carboxylic acid to phenolic compound and the amount of phenol recovered depends on the maximum temperature attained by the reagents and on the method used to liberate the phenol from the reduced copper body. Thus, oxidation of the acid and reduction of the cupric compound occurs at 200° to 275° C., but much better yields of phenol are obtained when the mixture is heated to 300°–400° C. at some stage in the process, and preferably after the copper ions have been reduced. Recovery of phenol is improved by passing steam over the reduced copper body.

The reaction may be carried out batchwise, as in sealed pressures vessels; semi-continuously, as in fixed bed reaction towers; or continuously, as in a fluid bed or a moving bed reaction system. When effected over fixed or moving bed masses of cupric oxide reagent, it is desirable to steam the phenolic product from the reduced copper which may then be reoxidized and returned to a point of contact with the molten or vaporized carboxylic acid.

The reactions producing phenol are apparently more involved than a simple decarbonylation or loss of carbon monoxide, although the net result when benzoic acid is converted to phenol is decarbonylation plus oxidation, with concurrent formation of carbon dioxide. With substituted benzoic acids of the type defined above, it becomes apparent that the phenolic hydroxyl is most commonly generated on a carbon atom in the benzene ring adjacent to the one to which the carboxyl was attached. Thus, ortho- and para-toluic acids each give meta-cresol, and para-nitrobenzoic acid gives meta-nitrophenol. Since the cupric ions are reduced, and the reaction appears not to be catalytic, it may be assumed that the reaction involves oxidation and decarboxylation:

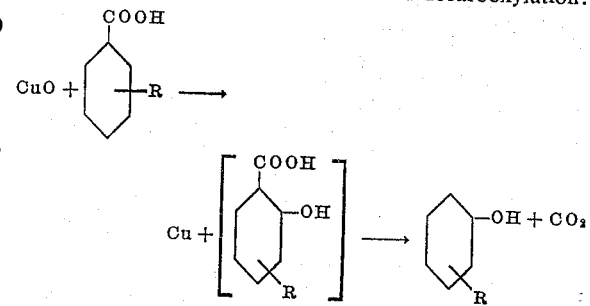

and not mere decarbonylation:

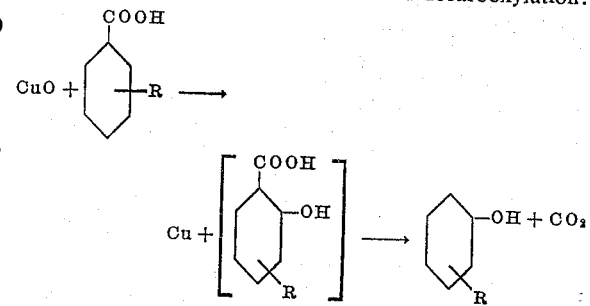

In the foregoing formulae, the symbol R represents hydrogen or a substituent radical which is inert under the reaction conditions.

It has been found that improved results are obtained if cupric oxide and cobaltic oxide ($Co_2O_3$) are both present, but that cupric oxide is far superior to any of several materials tried as possible catalysts or reagents. A series of runs was made in which a known weight of benzoic acid and from 1 to 2 equivalent weights of metal, metal oxide, or salt were sealed in glass tubes, heated to a temperature from 250 to 500° C. for from 15 minutes to 64 hours, and the contents of the tubes were analyzed. The results appear in the following table.

| Run No. | Original Charge | Temp., °C. | Time, Hours | Phenol found, mol percent of benzoic acid charge |
|---|---|---|---|---|
| 1 | Benzoic acid | 400 | 16 | .57 |
| 2 | do | 450 | 64 | .43 |
| 3 | do | 500 | 16 | .40 |
| 4 | do | 525 | 16 | .28 |
| 5 | Sodium benzoate | 500 | 16 | .73 |
| 6 | Calcium benzoate | 500 | 16 | 0.0 |
| 7 | Benzoic acid—$ZnCl_2$ | 400 | 16 | 0.18 |
| 8 | do | 350 | 64 | 0.54 |
| 9 | Benzoic acid—$FeCl_3$ | 400 | 16 | 0.0 |
| 10 | Benzoic acid—$CuCl_2$ | 300 | 16 | 0.0 |
| 11 | Benzoic acid—$CuSO_4$ | 350 | 16 | 3.92 |
| 12 | Benzoic acid—powdered Cu | 350 | 64 | 0.0 |
| 13 | Benzoic acid—$Al_2O_3$ | 400 | 16 | 0.0 |
| 14 | Benzoic acid—$Fe_2O_3$ | 275–300 | 16 | 0.0 |
| 15 | Benzoic acid—2NiO | 300 | 16 | 0.83 |
| 16 | Benzoic acid—$2Ag_2O$ | 300 | 16 | 0.75 |
| 17 | Benzoic acid—2HgO | 300 | 16 | 0.0 |
| 18 | Cupric benzoate | 300 | 16 | 9.5 |
| 19 | Benzoic acid—CuO | 350 | 64 | 10.2 |
| 20 | do | 350 | 16 | 9.4 |
| 21 | Benzoic acid—2CuO | 300 | 16 | 21.4 |
| 22 | do | 275 | 16 | 23.6 |
| 23 | do | 250 | 16 | 19.7 |
| 24 | Benzoic acid—2CuO, $Co_2O_3$ | 275 | 16 | 27.2 |
| 25 | Benzoic acid—2CuO | 300 | ¼ | 0.0 |
| 26 | do | 300 | ½ | 8.48 |
| 27 | do | 300 | 1 | 13.3 |
| 28 | Benzoic anhydride—2CuO | 300 | 16 | 8.6 |

It is seen from the table that cupric oxide is the only one of the agents tested which reacts with benzoic acid to give enough phenol to be of interest, and that it is more effective at temperatures from 250° to 350° C. than are the other agents at temperatures of 400° or higher. In the runs reported above, there was always a significant amount of unchanged benzoic acid, and, when the yields of phenol are calculated on the basis of unrecovered benzoic acid, rather than on the charge, they are found to be in the range from 40 to 60 percent, even in these small exploratory runs. In each instance in which a phenolic product could be detected, it was the principal identifiable organic material present, other than the unchanged original acid.

When toluene was heated in the same manner with cupric oxide, 3.18 mol percent was converted to phenol after 16 hours at 350° C.

Large scale runs were made at atmospheric pressure in heated cylindrical reaction vessels filled with cupric oxide supported on diatomaceous earth granules, or other inert carrier. In some cases a stationary bed of the cupric oxide reagent was employed, and in others there was used a moving bed. The benzoic acid was vaporized into contact with the cupric oxide while the latter was at a temperature of 250°–280° C. Green copper benzoate was formed to some extent, and the exothermic reactions heated the solid mass in the tube to about 300° C., and water was evolved, especially when the benzoic acid vapors were introduced rapidly. A purging stream of inert gas ($N_2$ or $CO_2$) or steam, or both, was passed through the reactor, either continuously with the benzoic acid vapors or intermittently between periods of introduction of benzoic acid. In intermittent operation purging was effected at 275° to 400° C. Less decomposition to undesired products occurred when steam was present in the purge stream. The effluent contained water, carbon dioxide, phenol, benzoic acid, phenylbenzoate and benzene. The organic matter was condensed from the effluent and separated by distillation. In typical runs, half of the condensed effluent product was recovered as unchanged benzoic acid. The other half was phenol, benzene and phenylbenzoate. The phenylbenzoate could be hydrolyzed to phenol and benzoic acid, with the latter being returned to the system. Following such practice, the yield of phenol based on benzoic acid consumed was about 65 mol percent and the yield of benzene was about 12 mol percent, even in small apparatus in which mechanical losses were unavoidably high. The conversion to phenol was about 20 percent per cycle. The productivity of the reaction mass is dependent on the amount of cupric copper present.

In the moving bed reactor, the benzoic acid vapor was introduced in an upper zone and reacted with the cupric oxide. The bed moved downward through a constricted passageway into another zone in which steam stripping, or phenol absorption in liquid water under pressure occurred and from which phenol was taken to a recovery system. The cupric oxide, cuprous oxide and copper, on the inert carrier, were passed through an oxidizing chamber and returned to the upper zone to meet more benzoic acid vapors.

It has been found, in a series of runs carried out under pressure in a closed vessel, in the manner described above, and with cupric oxide as the oxidizing agent, that the following carboxylic acids yield the indicated phenols in the here-described reaction:

| Acid | Phenolic product obtained |
|---|---|
| p-nitrobenzoic | m-nitrophenol. |
| m-nitrobenzoic | p-nitrophenol. |
| p-chlorobenzoic | m-chlorophenol and phenol. |
| m-toluic | p-cresol, o-cresol. |
| p-toluic | m-cresol. |
| o-toluic | Do. |
| p-methoxybenzoic | m-methoxyphenol and phenol. |
| p-phenylbenzoic | m-phenylphenol. |
| 2,4-dimethyl benzoic | 3,5-dimethyl phenol. |

When both ring positions adjacent to the carboxyl group are occupied by inert substituents, as in 2,4,6-trimethyl benzoic acid, the principal reaction is decarboxylation, and the principal product in the example mentioned is mesitylene.

We claim:
1. The method which comprises bringing a monocarboxylic acid of the benzene series in which the carboxyl group is attached to the benzene ring, having at least one open position adjacent the carboxyl group on the ring, and in which any other substituents are substantially inert to the oxidizing action of cupric oxide and are selected from the group consisting of phenyl, alkyl, alkoxy, nitro and halogen, into contact with an oxidizing agent consisting essentially of cupric oxide under superatmospheric pressure, at a temperature of at least 200° C. but below a temperature of destructive carbonization, until oxidation and decarboxylation of the acid has occurred, and releasing the pressure and recovering the so-produced free phenol from the reaction medium.

2. The method claimed in claim 1, wherein the oxidizing agent is cupric oxide mixed with cobaltic oxide.

3. The method which comprises heating benzoic acid with at least an equimolar amount of cupric oxide at 240° to 400° C., under superatmospheric pressure, until oxidation and decarboxylation of the acid has occurred, releasing the pressure and recovering phenol from the reaction mixture.

4. The method which comprises heating benzoic acid with at least an equimolar amount of cupric oxide at a temperature initially near 250° to 280° C., until the cupric oxide is reduced, and displacing the so-formed phenol from the reduced copper body by passing a stream of an inert gas therethrough at a temperature from 275° to 400° C.

5. The method claimed in claim 4, wherein the stream of inert gas comprises steam.

6. The method claimed in claim 4, wherein the inert gas is principally steam.

7. The method which comprises bringing a solid contact mass comprising cupric oxide sequentially (1) into contact with benzoic acid at a temperature from 200° to 400° C., until substantial reduction of the cupric oxide has occurred (2) into contact with an aqueous medium, to strip phenol from the reduced contact mass, (3) into an oxidizing zone to reconvert copper values to cupric oxide, and (4) repeating the cycle, and recovering the phenol released in the second said step.

8. The method claimed in claim 7, in which the cyclic operation is performed continuously in a multiple zone moving bed reaction system.

9. The method claimed in claim 7, in which the second said step comprises bringing the solid contact mass and adherent organic matter into intimate contact with liquid water to strip the phenol from the reduced contact mass.

10. The method claimed in claim 7, in which the aqueous medium employed in the second said step is an inert gas stream comprising steam.

References Cited in the file of this patent

UNITED STATES PATENTS

| | | |
|---|---|---|
| 2,727,926 | Kaeding et al. | Dec. 20, 1955 |
| 2,762,838 | Toland | Sept. 11, 1956 |

FOREIGN PATENTS

| | | |
|---|---|---|
| 108,938 | Great Britain | Aug. 30, 1917 |